United States Patent [19]

Iwasaki et al.

[11] Patent Number: 4,769,426

[45] Date of Patent: Sep. 6, 1988

[54] PROCESS FOR PREPARATION OF POLYARYLENE THIOETHERS HAVING HIGH MELT CRYSTALLIZATION TEMPERATURE

[75] Inventors: Takao Iwasaki; Yo Iizuka; Toshitaka Kouyama; Zenya Shiiki, all of Iwaki, Japan

[73] Assignee: Kureha Kagaku Kogyo Kabushiki Kaisha, Tokyo, Japan

[21] Appl. No.: 900,811

[22] Filed: Aug. 27, 1986

[30] Foreign Application Priority Data

Aug. 27, 1985 [JP] Japan .................. 60-188246

[51] Int. Cl.$^4$ .................. C08G 75/02; C08L 81/02
[52] U.S. Cl. .................. 525/537; 528/388
[58] Field of Search .................. 525/537; 528/388

[56] References Cited

U.S. PATENT DOCUMENTS

| | | | |
|---|---|---|---|
| 3,839,301 | 10/1974 | Scoggins | 525/537 |
| 3,879,355 | 4/1975 | Blackwell | 528/388 |
| 3,948,865 | 4/1976 | Brady et al. | 525/537 |
| 4,025,496 | 5/1977 | Anderson et al. | 260/79.1 |
| 4,038,262 | 7/1977 | Edmonds, Jr. | 260/79.1 |
| 4,237,039 | 12/1980 | Blackwell | 525/537 |
| 4,251,575 | 2/1981 | Brady et al. | 528/388 |
| 4,373,091 | 2/1983 | Edmonds, Jr. | 528/481 |
| 4,424,338 | 1/1984 | Cleary | 528/388 |
| 4,490,522 | 12/1984 | Kawabata et al. | 528/388 |
| 4,495,332 | 1/1985 | Shiiki et al. | 524/800 |
| 4,514,558 | 4/1985 | Shiiki et al. | 528/388 |
| 4,524,200 | 6/1985 | Sherk et al. | 528/388 |
| 4,537,951 | 8/1985 | Idel et al. | 528/388 |
| 4,537,953 | 8/1985 | Kawakami et al. | 528/388 |

FOREIGN PATENT DOCUMENTS

| | | |
|---|---|---|
| 0087038 | 8/1983 | European Pat. Off. . |
| 0126369 | 11/1984 | European Pat. Off. . |
| 0142024 | 5/1985 | European Pat. Off. . |
| 59-202222 | 11/1984 | Japan . |

OTHER PUBLICATIONS

7332/1986, Jap. Patent Laid Open Application.
Japanese Patent Applications 134,633/1984; 178010/1984; 178017/1984.

Primary Examiner—John C. Bleutge
Assistant Examiner—David W. Woodward
Attorney, Agent, or Firm—Wenderoth, Lind & Ponack

[57] ABSTRACT

Polyarylene thioethers having increased melt crystallization temperature are produced by subjecting a polyarylene thioether recovered from a conventional polycondensation of dichlorobenzene with sodium sulfide to a treatment with an aqueous non-oxidative strong acid such asd HCl, $H_2SO_4$ or $H_3PO_4$ or with an aqueous salt of the non-oxidative strong acid with a weak base such as ammonia.

4 Claims, No Drawings

PROCESS FOR PREPARATION OF POLYARYLENE THIOETHERS HAVING HIGH MELT CRYSTALLIZATION TEMPERATURE

BACKGROUND OF THE INVENTION

1. Field of the Invention

The present invention relates to a process for the preparation of polyarylene thioethers having an elevated melt crystallization temperature, which polyarylene thioethers are advantageously used in, among others, injection molding.

2. Description of the Prior Art

Among thermoplastic resins, a polyarylene thioether is a heat-resistant resin having a relatively high crystallization speed. Accordingly, it is expected that this polymer will be applied to injection molding for which a high crystallization speed is required.

Most heretofore marketed polyarylene thioethers are products in which the apparent melt viscosity is increased by subjecting a product having a relatively low melt viscosity (that is, a low molecular weight) to curing, that is, a high temperature treatment in the presence of oxygen or the like to carry out a reaction such as crosslinking or branching.

In a resin having a melt viscosity increased by curing, in general, the melt crystallization temperature (Tmc) (the temperature at which crystallization is caused when the molten resin is cooled) is much higher than the melt crystallization temperature of the untreated resin, and therefore, the crystallization speed is greatly increased. Accordingly, only in view of the crystallization behavior, it can be said that a cured polyarylene thioether is suitable for injection molding. However, although the crystallization behavior is appropriate, the cured polyarylene thioether is defective in that coloring is extreme, and, since it is highly crosslinked and branched, its mechanical strength is insufficient.

We have previously proposed a polymerization process in which a large amount of water is added midway in the polymerization reaction, and, simultaneously, the polymerization temperature is elevated (a linear polyarylene thioether having a high molecular weight is economically advantageously prepared by water-adding two-staged polymerization). See Japanese Patent Application No. 126725/84, which is now Japanese Patent Laid-Open Application No. 7332/1986.

Since a polyarylene thioether prepared according to this process ordinarily has a sufficiently high melt viscosity, the resin can be directly applied to melt processing such as extrusion molding or compression molding without curing, and, since curing is not carried out, coloring is substantially controlled. Moreover, this resin has excellent mechanical strength because it has a linear structure. However, it was found that this high-molecular-weight polyarylene thioether developed by us is still inadequate as a resin material for injection molding. More specifically, Tmc is somewhat too low for application to injection molding, and under certain processing conditions for solidifying the molten resin, it sometimes happens that crystallization is insufficient. It is desirable that polyarylene thioethers for injection molding have Tmc of at least 220° C., preferably at least 225° C.

Generally, the higher the Tmc is, the higher is the crystallization speed when the molten resin is cooled and solidified.

SUMMARY OF THE INVENTION

We carried out studies with a view to developing a process capable of increasing Tmc of a high-molecular-weight linear polyarylene thioether, and as a result we established a hypothesis that Tmc would be elevated by substantially neutralizing or acidifying basic residues (presumed to be —SNa and the like) bonded to the terminals of the polyarylene thioether. We furthered our research on the basis of this assumption and have now arrived at the present invention.

More specifically, in accordance with the present invention, there is provided the improvement in a process for the preparation of polyarylene thioethers comprising subjecting an alkali metal sulfide and a dihaloaromatic compound to dehalogenation/sulfidation in a polar organic solvent to form a polyphenylene thioether, which improvement comprises subjecting the polymer formed separated from the polymerization reaction mixture to a treatment with (A) a solution of a non-oxidative strong acid having a pH value less than 2 or (B) a solution containing 0.1 to 30% by weight of a salt of said strong acid with a weak base, at 0° to 100° C. for 5 to 500 minutes thereby to produce a polyarylene thioether having an increased melt crystallization temperature.

According to the process of the present invention, it has become possible to obtain a polyarylene thioether having a high melt crystallization temperature Tmc without a curing treatment accompanied by crosslinking and branching which are likely to degrade the inherent properties of the polymer. At the present, it is not known whether or not the above-mentioned hypothesis is correct, but the present invention is not limited by the above-mentioned hypothesis. Irrespectively, a polyarylene thioether prepared according to the process of the present invention is less colored and has high Tmc and hence, it has a high crystallization speed and is suitable for injection molding. Moreover, since the polymer need not be subjected to a curing treatment, the mechanical properties of the polymer are excellent. Furthermore, when a polyarylene thioether as polymerized subjected to the treatment of this invention for elevating Tmc, a considerable increase of melt flow rate or, in other words, a significant decrease of melt viscosity, occurs as an incidental effect without any substantial change in the molecular weight. This incidental effect also enhances the flow property and the melt processability of the polymer.

DETAILED DESCRIPTION OF THE INVENTION

Formation of Basic Structure of Polyarylene Thioether

A basic process for preparing a polyarylene thioether as the premise of the present invention will now be described.

The basic structure of the polyarylene thioether is formed by dehalogenation/sulfidation of a dihaloaromatic compound by an alkali metal sulfide in a polar organic solvent. In the present invention, it is preferable to prepare a substantially linear polymer having such a high molecular weight that a curing treatment need not be carried out, and from this viewpoint, the above-mentioned water-adding two-staged polymerization process developed by us is especially preferred.

Whether or not the water-adding two-staged polymerization is adopted, as the metal sulfide as the main starting material of the polymerization reaction as the premise of the present invention, sulfides of alkali metals such as Na, Li, K and Rb can be used (hydrous sulfides can also be used). As the other starting material, any of the dihalo-aromatic compounds can be used provided that it has two halogen substituents on the aromatic nucleus and can be polymerized through dehalogenation/sulfidation by an alkali metal or alkaline earth metal sulfide. Accordingly, the aromatic nucleus includes not only an aromatic nucleus composed solely of an aromatic hydrocarbon but also an aromatic nucleus containing substituents not inhibiting dehalogenation/sulfidation.

Examples of the dihalo-aromatic compound used in the present invention are compounds represented by the following formulae:

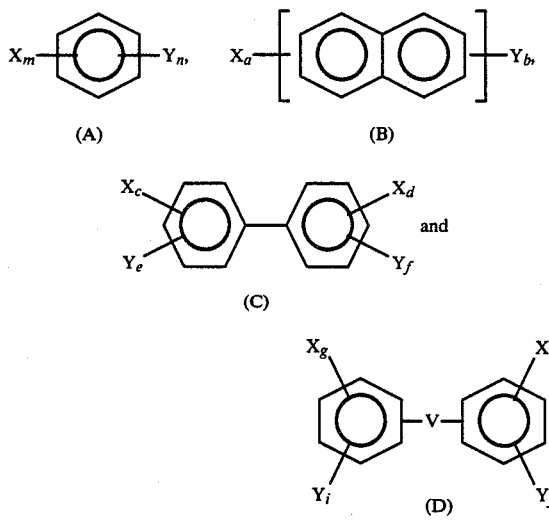

Substituents of the respective formulae will now be explained.

X is a halogen atom selected from Cl, Br, I and F, especially Cl and Br.

Y is selected from —R, —OR and —COOH (R is H, an alkyl group, a cycloalkyl group, an aryl group or an aralkyl group). Ordinarily, the alkyl group or alkyl portion has 1 to about 18 carbon atoms, and the aryl group or aryl portion has 6 to about 18 carbon atoms.

V is selected from the group consisting of —O—, —CO—,

—S—, —SO—, —SO$_2$— and

(R' and R" are selected from the group consisting of H, an alkyl group, a cycloalkyl group, an aryl group and an aralkyl group). The alkyl group or alkyl portion and the aryl group or aryl portion are as defined above.

In the formula (A), m is 2 and n is an integer of from 0 to 4.

In the formula (B), a is 2 and b is an integer from 0 to 6.

In the formula (C), c is an integer of from 0 to 2, d is an integer of from 0 to 2, the sum of c and d is 2, e and f are each an integer of from 0 to 4.

In the formula (D), g is an integer of from 0 to 2, h is an integer of from 0 to 2, the sum of g and h is 2, i and j are each an integer of from 0 to 4.

Specific examples of the di-halogen-substituted aromatic compounds represented by the above general formulae are p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide, 4,4'-dichlorodiphenylketone, and 4,4'-dichlorodiphenyl sulfide. Among these compounds, p-dichlorobenzene, m-dichlorobenzene and 4,4'-dichlorodiphenyl sulfone are especially preferred.

A copolymer comprising at least 2 different kinds of reaction units can be obtained by using at least two appropriate dihalo-aromatic compounds in combination, as is apparent from the foregoing description. For example, is p-dichlorobenzene is used in combination with m-dichlorobenzene or 4,4'-dichlorodiphenyl sulfone, a copolymer comprising

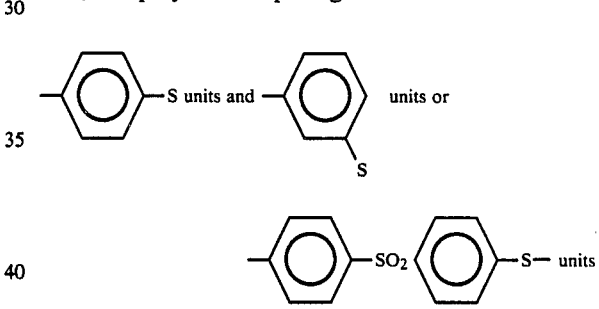

can be obtained. Also, a small amount of tri- or more halo-substituted aromatic compounds is permitted to be used provided that it does not substantially change the characteristics of a polyarylene thioether of a linear molecular structure.

An aprotic solvent is preferred as the polar organic solvent used for the polymerization as the premise of the present invention. Amides or organic ureas such as N-methylpyrrolidone, hexamethylphosphoryl triamide, 1,3-dimethyl-2-imidazolinone and tetramethylurea are especially preferred because they have high stability.

If dehalogenation/sulfidation of the dihaloaromatic compound by the alkali metal sulfide is carried out in a polar organic solvent as described above, a polyarylene thioether can be obtained. Various modifications of this polymerization process have been proposed to increase the molecular weight or to attain other objects. In the present invention, these modifications can also be adopted, as long as a substantially linear resin is obtained, and attainment of the intended objects of the present invention is not inhibited.

A polyarylene thioether to which the treatment of the present invention is preferably applied is one prepared according to the above-mentioned process of Japanese Patent Laid-Open Application No. 7332/1986 or a block copolymerization process disclosed in Japanese Patent Application Nos. 134633/1984, 178016/1984 and 178017/1984.

IMPROVEMENT OF TMC BY THE PRESENT INVENTION

Summary of Treatment

Injection molding may require that polyarylene thioethers have Tmc of at least 220° C., preferably 225° C.

According to the present invention, the above described process for preparing a polyarylene thioether is modified and a process capable of preparing a polymer having high Tmc is provided. This modified process of the present invention will now be described.

According to the modified process of the present invention, a polymer formed is separated from the polymerization reaction mixture liquid after completion of the polymerization conducted in the above described manner, and the polymer is treated with a solution of (A) a strong acid or (B) a salt of the strong acid with a weak base. It is assumed that by this treatment, terminal basic residues of the polymer will be neutralized or acidified (of course, the present invention is not restricted by this assumption, as pointed out hereinbefore).

In the treatment process of the present invention, a solid polymer separated from the polymerization reaction mixture liquid is used. The solid polymer can be a solid polymer which is separated from the mixture liquid by filtration or sieving, and to which the organic polar solvent used for the polymerization still adheres, or a solid polymer obtained by removing the adhering polar organic solvent by washing with a solvent in which the polar organic solvent is soluble, such as methanol or water. When the particle size of the polymer is coarse, it is preferred that the polymer be pulverized and finely divided by a mill or the like. It is generally preferred that the solid polymer to be treated according to the present invention be in the form of such a wet cake. However, if necessary, this wet cake can be dried to obtain a dry solid from which the adhering solvent (the polymerization solvent and/or washing solvent) is substantially completely removed.

This polymer is treated with a solution of a strong acid or a solution of a salt of the strong acid with a weak base. It is preferred that the concentration of the polymer in the treating solution be 2 to 50% by weight.

Treatment with Strong Acid

The above-mentioned polymer is added to a solution of a non-oxidative strong acid and the treatment is carried out at a pH value less than 2, preferably at a pH value less than 1.5. A pH value not less than 2 is not preferred because reaction of the terminal residues is insufficient. The treatment temperature is 0° to 100° C., preferably 20° to 100° C., especially preferably 20° to 80° C. If the treatment temperature is lower than 0° C., the solution of the strong acid hardly permeates into the core portion of the solid polymer (ordinarily granular or powdery). On the other hand, if the treatment temperature is higher than 100° C., there is a risk of deterioration or decomposition of the polymer. The treatment time is 5 to 500 minutes, especially preferably 10 to 300 minutes. If the treatment time is shorter than 5 minute, the reaction is insufficient, and if the treatment time is longer than 500 minutes, the process becomes economically disadvantageous because the treatment efficiency is not substantially increased by prolongation of the treatment time.

As the acid used for the strong acid solution, such strong acids as those having a dissociation constant K of at least $10^{-3}$ at 25° C. in an aqueous solution are preferable. Strong acids which are oxidative as such or in a given state can invite oxidation/degradation of the polyarylene thioether treated. Non-oxidative acids such as hydrochloric acid, sulfuric acid, phosphoric acid, formic acid and halogenoacetic acids are thus preferred.

As the solvent of the strong acid solution, water and mixed solvents comprising water as the main component and an organic water-soluble solvent such as an alcohol, ketone or ether are used. It is preferred that the alcohol, ketone or ether have compatibility with water and acid dissolving capability sufficient to form an aqueous solution as the solvent. The solubility in water of such an organic solvent, the water dissolving capability of the solvent and the strong acid dissolving capability of the organic solvent can be determined from an ordinary handbook or the like. In view of the chemical stability and from the economical viewpoint, hydrochloric acid, sulfuric acid and phosphoric acid are preferred, and as the solvent, water, an aqueous solution of an alcohol (especially, a lower alcohol) and an aqueous solution of a ketone (especially, a di-lower-alkyl ketone) are preferred.

The atmosphere in which the acid treatment is conducted can be air since no oxidation nor curing of the polymer will take place at such a moderate temperature as 0° to 100° C. It is preferable, however, that the acid treatment be conducted in a non-oxidative atmosphere.

After the treatment with the solution of the strong acid, the solid polymer is thoroughly washed with water to remove the adhering solution of the strong acid, or the solid polymer thus treated is subjected to neutralization with a weak base such as ammonia and subsequent water washing. Such a treatment method is preferred for obtaining a thermally and chemically stable polymer. The latter method using a weak base for the neutralization is especially preferred becasue a polymer having excellent hue can be easily obtained. Incidentally, if this neutralization is carried out with a strong base, Tmc is returned to a level substantially equal to the level before the treatment with the solution of the strong acid, and therefore, use of a strong base is not preferred.

Treatment with Salt of Strong Acid with Weak Base

This treatment corresponds to a process in which the above-mentioned treatment with the solution of the strong acid and neutralization with the weak base are simultaneously carried out. As the strong acid in the strong acid-weak base salt, strong acids used for the above-mentioned strong acid solution, such as hydrochloric acid, sulfuric acid, phosphoric acid, formic acid and halogenoacetic acids are preferred, and, as the weak base, such as one having a dissociation constant K of at most $10^{-4}$ at 25° C. in an aqueous solution is preferable, such as ammonia or the like is preferred. Among these salts, $NH_4Cl$, $(NH_4)_2SO_4$ and $(NH_4)_3PO_4$ are especially preferred because their effect is high.

Solvents as mentioned above with respect to the strong acid solution can be used as the solvent used for the solution of the salt. In view of the high salt dissolving capability, water and/or an alcohol (especially a lower alcohol) is preferred.

The concentration of the salt in the strong acid-weak base salt solution as the treating solution is 0.1 to 30% by weight, preferably 0.2 to 20% by weight. If the salt concentration is lower than 0.1% by weight, the effect is insufficient, and if the salt concentration is higher than 30% by weight, the treatment is economically disadvantageous because the effect is not substantially enhanced even by increasing the salt concentration.

The treatment temperature is 0° to 100° C., preferably 20° to 100° C., especially preferably 20° to 80° C., and the treatment time is 5 to 500 minutes, especially preferably 10 to 300 minutes. The reasons for limitation of the treatment temperature and treatment time are the same as those mentioned above with respect to the strong acid treatment. Consideration of the treatment atmosphere as given in terms of the strong acid treatment also applies here.

If the polymer treated is washed with water after the treatment with the salt solution, a cleaned stable polymer can be simply obtained.

Polymer of the Invention

The so-obtained polyarylene thioether has very high Tmc and hence, a very high crystallization speed. Accordingly, when this polyarylene thioether is used for injection molding, the polymer is sufficiently crystallized while the molten polymer is cooled and solidified, and therefore, the resulting molded article need not be subjected to a high-temperature treatment (so-called annealing) again. Furthermore, the flow property and melt processability are considerably enhanced owing to the significant increase of melt flow rate.

Accordingly, the arylene thioether polymer obtained according to the process of the present invention is especially suitable for injection molding. Moreover, since the polymer is not subjected to curing, the polymer has excellent hue, and since the polymer has a substantially linear molecular structure, a molded article of high mechanical strength can be easily obtained.

Since the arylene thioether polymer according to the present invention is included in the category of a thermoplastic polymer, the polymer of the present invention can be subjected to various modifications applicable to thermoplastic polymers. For example, the polymer of the present invention can be used in a state where it is mixed with a powdery filler such as carbon black, calcium carbonate, silica, titanium oxide, alumina, calcium silicate, talc, mica, kaolin, calcium sulfate, iron oxide, or glass powder or a fibrous filler such as carbon fiber, glass fiber, asbestos, polyaramide fiber, alumina fiber, silica fiber, potassium titanate fiber, calcium sulfate fiber, zirconia fiber or wollastonite. Moreover, the polymer can be used in a state wherein, it is mixed with at least one synthetic resin selected from polycarbonates, polyphenylene oxides, polysulfones, polyarylenes, polyacetals, polyimides, polyamides, polyesters, polystyrenes, ABS resins and the like and/or at least one elastomer selected from the group of olefin elastomers, silicone elastomers, fluor-rubbers, hydrogenated SBRs, butyl rubbers, copolyester elastomers and copolyamide elastomers.

EXPERIMENTS

Synthesis Example

A titanium-lined polymerization vessel was charged with 371 Kg of hydrous sodium sulfide (having 46.1% assay) and 800 Kg of N-methylpyrrolidone, and the temperature was elevated to about 203° C. to distil water. Then, the polymerization vessel was after-charged with a liquid mixture comprising 318 Kg of p-dichlorobenzene, 2 Kg of m-dichlorobenzene and 280 Kg of N-methylpyrrolidone. Then, the temperature was elevated to 220° C. and polymerization was carried out for 4 hours. Then, 115 Kg of water was after-charged into the polymerization vessel, and the temperature was elevated to 260° C. and polymerization was continued for 5 hours. The polymer was recovered from the reaction liquid by sieving, and the polymer was washed with methanol and then with water and the slurry was treated by a mill to pulverize the polymer. Then, the slurry was filtered to obtain a wet cake W1 of the polymer (water content=48%).

This wet cake W1 was subjected to a treatment with a solution of a strong acid or a treatment with a buffer solution containing a strong acid-weak base salt.

Examples A-1 through A-5 and Comparative Examples A-6 through A-8 (Strong Acid Treatment)

To a specific amount of a strong acid solution formed by dissolving a strong acid in a solvent shown in Table 1 was added the wet cake W1. The polymer concentration was 8% by weight, and the pH value of the mixture was adjusted to a level shown in Table 1.

In the case where an ammonia post-treatment was not carried out, the acid-treated polymer was directly filtered and washed with water and was then dried in vacuo at 80° C. overnight to obtain a treated polymer. In the case where an ammonia post-treatment was carried out, ammonia was added after the acid treatment, and neutralization was conducted until the pH value was increased to about 9. The treated polymer was recovered by filtration, washed with water and dried in vacuo at 80° C. overnight.

The melting crystallization temperature (Tmc) was measured according to the following method. The polymer sample was pre-heated in a nitrogen stream at 320° C. for 2 minutes and then melt-pressed by a hot press at 320° C. for 1 minute and quenched by water to prepare an amorphous sheet having a thickness of about 0.25 mm.

By using a differential scanning calorimeter (Model DSC-30 supplied by Shimadzu Seisakusho, Japan), 10 mg of the sheet sample was made molten at 300° C. and then cooled from 300° C. at a cooling speed of 10° C./min. in a nitrogen stream, and the exothermic peak observed was designated as Tmc.

The results obtained are collectively shown in Table 1.

Examples B-1 through B-3 and Comparative Example B-4

(Buffer Solution Treatment)

To a strong acid-weak base salt was added a specific amount of water to form an aqueous solution having a specific concentration, and the wet cake W1 was added to the solution in such an amount that the polymer concentration was 8% by weight. The treatment was conducted at a specific temperature for a predetermined time.

After the treatment, the polymer was recovered by filtration, washing with water and drying in vacuo at 80° C. overnight. Thus, polymers B-1 through B-4 were obtained. Amorphous sheets were prepared from these polymers as described in Examples A-1 through A-5, and Tmc was measured.

The obtained results are collectively shown in Table 2.

TABLE 1

| | Acid Solution | | Treatment Conditions | | | Neutraliza-tion with Ammonia | Physical Properties of Polymer Sheet | |
|---|---|---|---|---|---|---|---|---|
| | Acid | solvent | pH | Temp. (°C.) | Time (min.) | | Tmc (°C.) | Hue |
| A-1 | HCl | Water | 1.0 | 30 | 20 | yes | 245 | faint red |
| A-2 | HCl | " | 1.5 | 30 | 20 | no | 236 | light brown |
| A-3 | HCl | water 95*¹ acetone 5 | 1.0 | 60 | 10 | yes | 255 | faint red |
| A-4 | H₂SO₄ | water 95*¹ acetone 5 | 1.0 | 60 | 10 | yes | 253 | faint red |
| A-5 | H₃PO₄ | water 80*¹ ethanol 20 | 1.2 | 40 | 15 | yes | 240 | faint red |
| A-6 | — | water | 7 | 30 | 20 | — | 210 | faint red |
| A-7 | HCl | " | 2.6 | 30 | 20 | no | 213 | light brown |
| A-8 | HCl | " | 3.5 | 30 | 20 | yes | 212 | faint red |

*¹weight ratio

TABLE 2

| | | Treatment Conditions | | | Physical Properties of Polymer Sheet | |
|---|---|---|---|---|---|---|
| | Kinds of Salt | Concentration (% by wt.) | Temp. (°C.) | Time (min.) | Tmc (°C.) | Hue |
| B-1 | NH₄Cl | 0.5 | 60 | 20 | 241 | faint red |
| B-2 | (NH₄)₂SO₄ | 1.0 | 60 | 20 | 242 | faint red |
| B-3 | (NH₄)₃PO₄ | 1.0 | 60 | 30 | 240 | faint red |
| B-4 | NH₄Cl | 0.02 | 60 | 20 | 213 | faint red |

Example C

The procedure under the conditions set forth in Synthesis Example was followed thereby to produce a wet cake W2 with a water content of 46%.

The polymer thus produced was subjected to each of the treatments and after treatments set forth in Examples A-1, B-1 and B-2 except that the treatment time was changed to 15 minutes or 60 minutes whereby dried polymer samples of C-A1(15), C-A1(60), C-B1(15), C-B1(60), C-B2(15) and C-B2(60) were obtained.

A portion of the wet cake W2 was subjected to washing with water and then to drying in vacuo at 80° C. overnight, whereby a dried polymer sample of C was obtained. The obtained samples of C, C-A1(15), C-A1(60), C-B1(15), C-B1(60), C-B2(15) and C-B2(60) were subjected to measuring their melt flow rates (at 650° F. under a load of 5 kg in accordance with the method of ASTM D1238), their inherent viscosities in the solutions in 1-chloronaphthalene (at a concentration of 0.4 g/dl at 206° C.) and their Tmc values. Their melt flow rates thus obtained were 380, 910, 930, 900, 930, 860 and 890 (g/10 min.).

Their inherent viscosities were 0.32, 0.31, 0.31, 0.30, 0.31, 0.32 and 0.30 (dl/g). The Tmc values were 208, 242, 256, 240, 250, 240 and 252 (°C.).

Regarding inherent viscosities, no substantial alternation was observed after the above-mentioned treatments. On the other hand, with respect to melt flow rates and Tmc values, dramatical increases were observed for the first 15 mins' treatments, but no substantial changes were observed after then. From these data, no substantial curing effects were observed.

Among the thus obtained polymers, polymers C-A1(15) and C-B1(15) were subjected to melt-spinning by means of a melt-tension tester equipped with a nozzle having holes of 0.3 mmΦ×0.6 mmL, with being taken up at elongation ratio ($R_1$) of 100 under air cooling. Then, the spun filaments were stretched at stretching ratio of 3.5 at 90° C. by means of an oil bath. Further, the stretched filaments were heat-set at 230° C. for 1.5 seconds under a restricted elongation below 3%. The average Young's moduli and breaking strengths of the filaments obtained were 750 and 770 (kg/mm²) and 60 and 65 (kg/mm²), respectively.

What is claimed is:

1. In a process for the preparation of polyarylene thioethers comprising subjecting an alkali metal sulfide and a dihalo-aromatic compound to dehalogenation/-sulfidation in a polar organic solvent to form a polyarylene thioether, the improvement which comprises subjecting the polymer formed separated from the polymerization reaction mixture to a treatment, without causing substantial cure of said polymer with a solution containing 0.1 to 30% by weight of an ammonium salt of hydrochloric acid, sulfuric acid or phosphoric acid at 0° to 100° C. for 5 to 500 minutes thereby to produce a polyarylene thioether having an increased melt crystallization temperature and an increased melt flow rate.

2. The process for the preparation of polyarylene thioethers according to claim 1 wherein the polymer separated from the polymerization mixture with the polar organic solvent adhering thereto is subjected to the treatment.

3. The process for the preparation of polyarylene thioethers according to claim 1 wherein the polymer separated from the polymerization mixture with the polar organic solvent adhering thereto is washed with a solvent in which the polar organic solvent dissolves, and the polymer thus washed with the washing solvent adhering thereto is subjected to the treatment.

4. The process for the preparation of polyarylene thioethers according to claim 1 wherein the salt is ammonium chloride.

* * * * *